Figure 1:
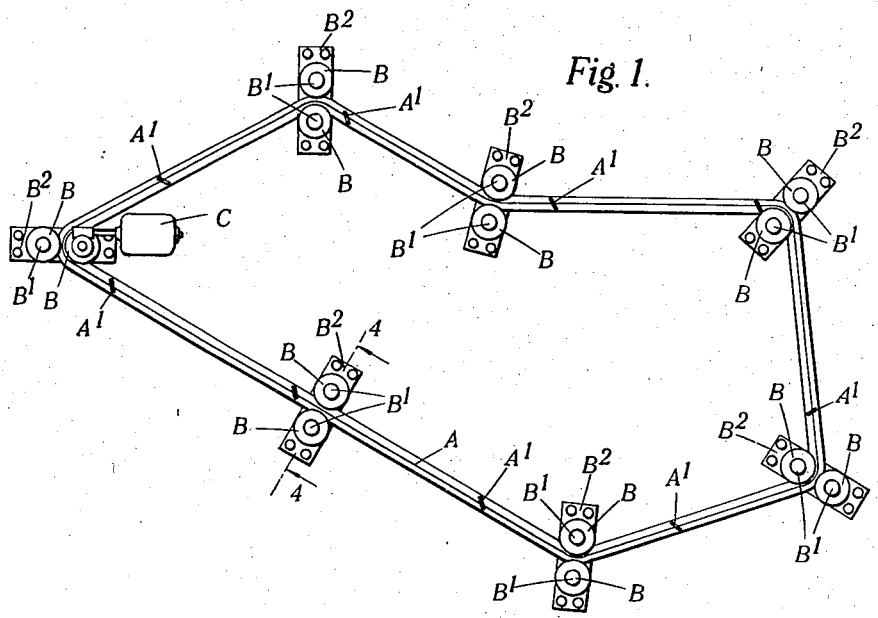

Feb. 7, 1939.    A. SIMON    2,146,689
BELT CONVEYER
Filed Feb. 7, 1938    4 Sheets-Sheet 1

INVENTOR
Abram Simon
BY
ATTORNEYS

Feb. 7, 1939.  A. SIMON  2,146,689
BELT CONVEYER
Filed Feb. 7, 1938  4 Sheets-Sheet 2
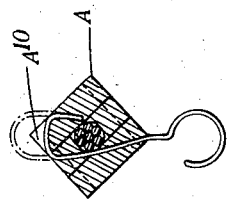
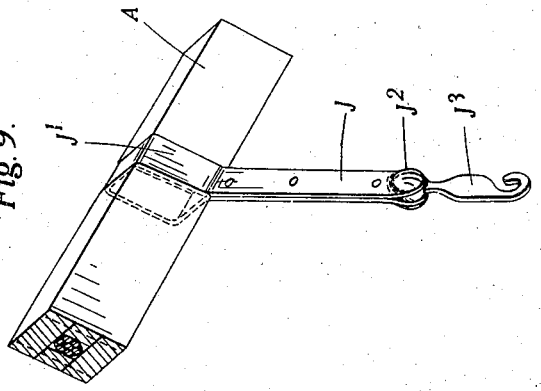
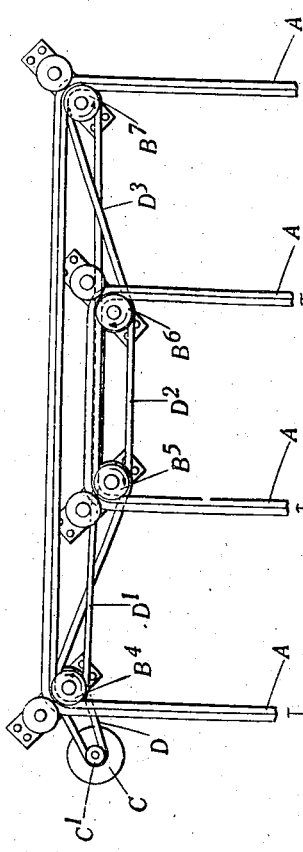
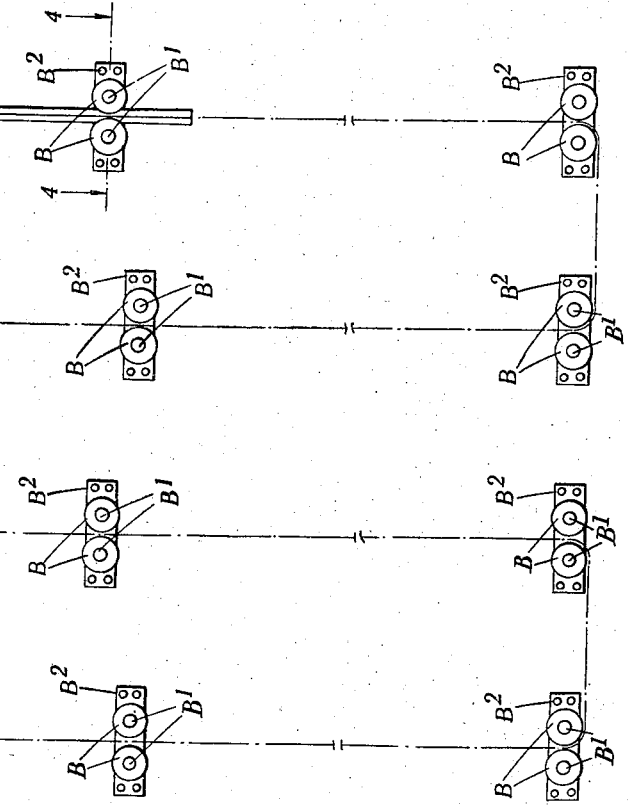
INVENTOR
Abram Simon
BY
ATTORNEYS

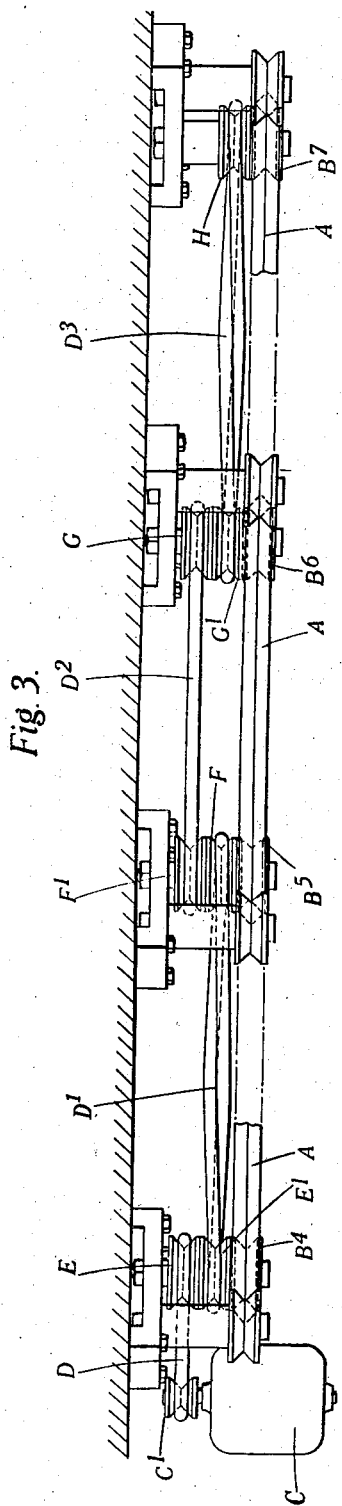

Feb. 7, 1939.　　　　A. SIMON　　　　2,146,689

BELT CONVEYER

Filed Feb. 7, 1938　　　　4 Sheets-Sheet 4

INVENTOR
Abram Simon
BY
ATTORNEYS

Patented Feb. 7, 1939

2,146,689

UNITED STATES PATENT OFFICE 2,146,689

BELT CONVEYER

Abram Simon, Northampton, England

Application February 7, 1938, Serial No. 189,254
In Great Britain February 12, 1937

13 Claims. (Cl. 198—177)

This invention relates to belt conveyers of the kind in which articles to be carried by the conveyer are suspended from the belt, and the object of this invention is to provide an improved belt conveyer in which the belt can follow a devious path in a horizontal plane and can also be deflected from this path in an upward or downward direction, the belt being suitably supported and guided, while having the suspension devices clear of the means by which the belt is guided.

According to the present invention the belt conveyer comprises an endless belt having lateral supporting surfaces arranged on either side of connecting means for suspending articles to be conveyed, and supporting pulleys arranged in pairs one on either side of the belt and engaging the lateral surfaces of the belt which is supported and guided thereby. The lateral surfaces of the belt may be formed horizontal or oppositely inclined, that is inclined downwardly towards one another, while the axes of the pulleys may be suitably inclined, to allow the pulleys to engage the inclined surfaces of the belt, or the pulleys may be mounted on vertical axes and formed with inclined surfaces which engage the corresponding inclined surfaces of the belt. Alternatively, the pulleys may be formed not only with inclined surfaces, but also mounted on inclined axes so that they support and guide the belt.

In some cases other pulleys may be arranged above the belt to prevent it from rising off the supporting pulleys, in which case these other pulleys may be mounted on horizontal axes or may be arranged one on either side of the belt in pairs, each pulley of a pair being then conveniently mounted on the same vertical axle as the supporting pulley.

Preferably, however, the belt is provided on each side of a central longitudinal plane with two oppositely inclined surfaces, each supporting pulley being shaped as to its peripheral part to engage the inclined surfaces on one side of this longitudinal plane and thereby to support and guide the pulley both in a horizontal and a vertical plane. Thus, the pulleys may have V-grooved peripheries to accommodate the inclined surfaces on the belt or they may be shaped as to their peripheral parts to engage inclined surfaces constituting the inclined sides of grooves extending longitudinally in the sides of the belt.

The belt may be formed of various materials, for example of leather, rubber, impregnated woven fabric or balata and may be constructed in various ways. Preferably, however, the belt comprises a flexible but substantially inextensible core formed, for example, of wire or chain embedded or enclosed in a covering of flexible covering material of a relatively deformable nature such as leather, impregnated woven fabric, balata, rubber or the like suitable for engaging the surfaces of the supporting pulleys. In this case, where, as is generally preferred, the core is formed of wire, this may be stranded steel or like wire and the ends of the core are conveniently united to form an endless core, for example by attaching the ends of the core to suitable fastening means by soldering or otherwise. In any case, the covering material conveniently encloses the fastening means so as to give an unbroken outer surface to the belt.

This covering material may be built up in two or more layers to enclose the core, these layers being connected by cementing or stitching or both throughout their lengths, each layer comprising either a single length of material or two or more separate lengths abutting at their ends and so arranged that the points where the lengths constituting one layer abut lie between the ends of the lengths constituting the adjacent layer or layers.

The invention may be carried into effect in various ways but two constructions according to the invention and a number of modifications thereof are illustrated by way of example in the accompanying drawings, in which Figure 1 shows diagrammatically in underneath plan one construction of conveyer according to the invention, Figure 2 shows also diagrammatically in underneath plan an alternative form of conveyer according to the invention, Figure 3 is a side elevation showing diagrammatically how the various driven pulleys in Figure 2 are connected to the source of power.

Figure 6:
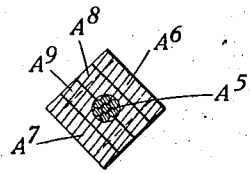
Figure 4:
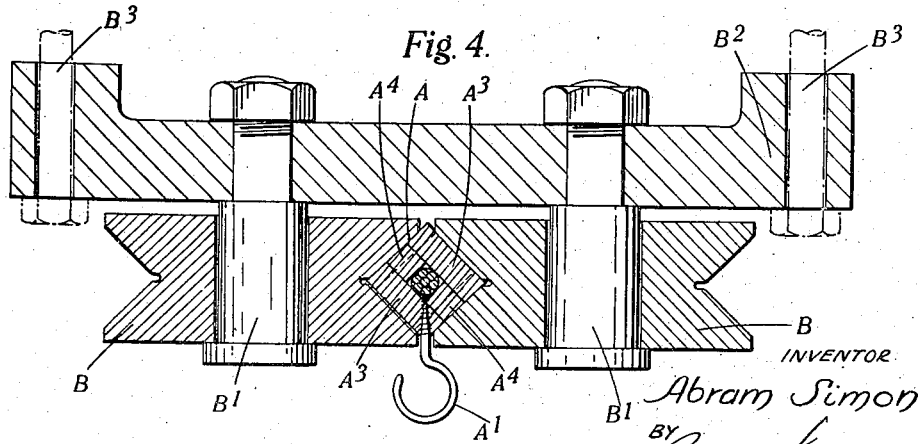
Figure 5:
Figure 7:
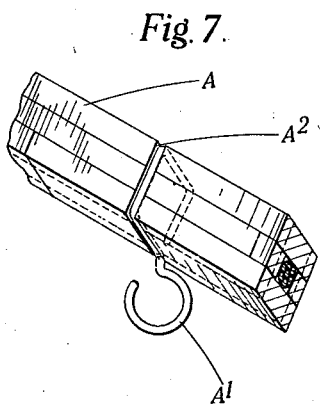
Figure 10:
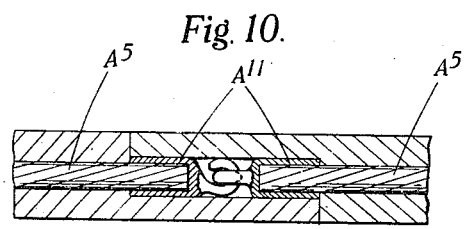
Figure 12:
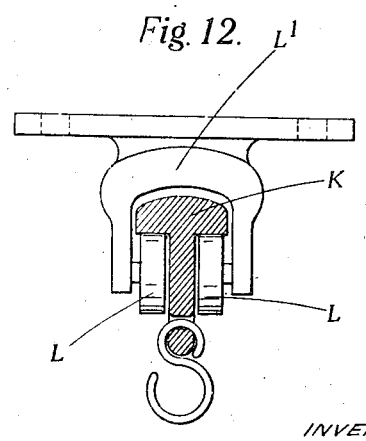
Figure 11:
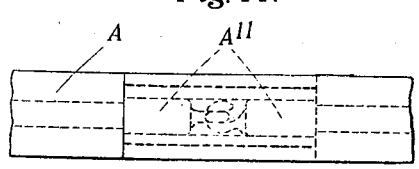

Figure 4 is a section on an enlarged scale on the line 4—4 of Figure 1 or of Figure 2 showing the general arrangements of the pairs of guide pulleys and one cross-sectional form of the belt, Figure 5 is a perspective view of a length of the construction of belt shown in Figure 3 or Figure 4, Figure 6 shows the cross-section of an alternative construction of belt, Figures 7, 8 and 9 illustrate three alternative forms of device for connecting to the conveyer belt articles to be conveyed, Figure 10 is a longitudinal section through a belt showing one form of fastening for the ends of the inextensible core, Figure 11 is a plan view of the construction shown in Figure 10, and Figure 12 shows an alternative form of belt and an alternative arrangement of guide pulleys which may be adopted in a modified construction according to the invention.

In the construction illustrated in Figures 1 and 4, the conveyer comprises an endless belt A of square cross-section which is supported and guided by a series of pairs of guide pulleys B, the pulleys in each pair being mounted to rotate on spindles $B^1$ secured to brackets $B^2$ which can be attached, for example by bolts indicated at $B^3$, to a suitable framework or mounting. Means are provided for driving the belt, for example by imparting rotation to one or more of the guide pulleys from a source of power such as an electric motor. In such an arrangement it is usually necessary to drive a number of the guide pulleys and in this case each of a number of these pulleys may be driven by an electric motor, as indicated for one guide pulley at G, the number of the driven guide pulleys being determined to suit circumstances.

In the alternative construction illustrated in Figures 2, 3 and 4, the conveyer comprises a belt A of square cross-section supported and guided by a series of pairs of guide pulleys B arranged in a similar manner to the guide pulleys in the construction shown in Figure 1. In the arrangement shown in Figures 2 and 4, however, means are provided whereby a number of these guide pulleys can be driven from a single source of power, for example an electric motor C, this being made readily possible by the general course followed by the conveyer belt A. Thus, in the arrangement shown in Figures 2 and 3 four of the guide pulleys B, which for the sake of convenience are lettered $B^4$, $B^5$, $B^6$, $B^7$, have formed integral therewith driving pulleys to which power is transmitted from the motor C. Thus, a pulley $C^1$ on the motor C is connected by a belt D to a pulley E rigid with the guide pulley $B^4$, a second driving pulley $E^1$ also rigid with the guide pulley $B^4$ is connected by a crossed belt $D^1$ to a pulley F rigid with the guide pulley $B^5$, a pulley $F^1$ also rigid with the guide pulley $B^5$ is connected by an uncrossed belt $D^2$ to a driving pulley G rigid with the guide pulley $B^6$ and a further driving pulley $G^1$ also rigid with the guide pulley $B^6$ is connected by a crossed belt $D^3$ to a pulley H rigid with the guide pulley $B^7$. In this way, the guide pulleys $B^4$, $B^5$, $B^6$, $B^7$ are all driven from the electric motor C in the desired direction so as to cause the belt to travel.

The belt A as shown in Figures 4 and 5 consists of four layers of material, for example leather two of which $A^3$ constituting outer layers are of the full width of the belt and have a thickness equal to a third of this width while the other two, $A^4$, constituting intermediate layers lie one on each side of an inextensible core $A^5$, which may be of stranded wire as shown, adjacent layers being connected together by cementing or stitching or both.

In the alternative construction illustrated in cross-section in Figure 6, the belt comprises four layers $A^6$, $A^7$, $A^8$, $A^9$ each of the full width of the belt arranged in parallel planes and connected together by cementing, stitching or both, the two intermediate layers $A^8$, $A^9$ being provided with longitudinal grooves which together form a recess of circular cross-section in which lies the inextensible wire core $A^5$.

In any case the belt is provided in the longitudinal plane lying between the guide pulleys with means for suspending therefrom articles to be conveyed, for example hooks $A^1$ which may be screwed into the belt as shown in Figures 4 and 5 or connected to the belt by an encircling part engaging a groove $A^2$ as shown in Figure 7, or may be attached to the belt as shown in Figure 8 by piercing the belt, passing the shank of the hook through it, bending the end of the shank over as shown in dotted lines and then drawing the shank back so that the bent part lies in a slot $A^{10}$ and the end enters a second pierced hole.

An alternative form of device for suspending the articles to be conveyed, particularly suitable for use where the conveyer during part or substantially the whole of its travel moves vertically, is shown in Figure 9 and comprises an arm J constituted for example by two layers of sheet metal, one end of which is formed into a socket $J^1$ of square cross-section which lies in a groove in and grips the belt, while its other end is connected by a universal joint, for example a ball joint $J^2$, to a hook or the like $J^3$.

The ends of the belt may be connected together as indicated in Figures 10 and 11 by providing coupling members $A^{11}$ secured by soldering or otherwise to the ends of the inextensible core $A^5$ while the ends of the part of the belt constituted by the layers of leather or like material are cut away to provide overlapping parts which enclose the coupling members as shown while leaving no break in the continuity of the outer surface of the belt, these overlapping parts being connected by cementing or stitching.

In an alternative construction generally similar to that described above each of the pulleys B may be formed in two separately rotatable upper and lower parts separated in the plane in which the base of the V-groove lies.

In another alternative construction instead of providing a belt of the cross-section shown in Figures 1 to 11 of the accompanying drawings, cooperating with pairs of guide pulleys having V-grooves formed in their peripheries as shown, a belt K of T cross-section may be provided, as shown in Figure 12, this belt being supported and guided by pairs of guide pulleys L, the pulley of each pair having a common axis of rotation and being rotatably supported by a U-shaped suspension member $L^1$ adapted to be attached to a suitable supporting frame or the like. In this construction the part $D^1$ of the belt which passes between the guide pulleys carries suitable supporting members $D^2$ for the articles to be conveyed.

What I claim as my invention and desire to secure by Letters Patent is:—

1. A belt conveyer for carrying articles by suspension from a belt including in combination an endless belt having lateral surfaces and connecting means for supporting articles to be conveyed lying between such lateral surfaces and pulleys arranged in pairs one on either side of the belt and engaging the lateral surfaces to support and guide the belt.

2. A belt conveyer for carrying articles by suspension from a belt including in combination an endless belt formed with two oppositely inclined lateral surfaces disposed on either side of its longitudinal axis, connecting means for supporting articles to be conveyed lying between the lateral surfaces and supporting pulleys arranged in pairs one on either side of the belt and engaging the oppositely inclined lateral surfaces to guide and support the belt.

3. A belt conveyer for carrying articles by suspension from a belt including in combination an endless belt formed with two oppositely inclined lateral surfaces disposed on either side of its longitudinal axis, connecting means for supporting articles to be conveyed lying between the lateral surfaces, supporting pulleys arranged in pairs one on either side of the belt and engaging the lateral surfaces to guide and support the belt and additional pulleys engaging the belt to maintain it in contact with the supporting pulleys.

4. A belt conveyer for carrying articles by suspension from a belt including in combination an endless belt formed with two oppositely inclined lateral surfaces disposed on either side of its longitudinal axis, connecting means for supporting articles to be conveyed lying between the lateral surfaces and supporting pulleys arranged in pairs on vertical axes one on either side of the belt and engaging the lateral surfaces to guide and support the belt.

5. A belt conveyer for carrying articles by suspension from a belt including in combination an endless belt formed with two oppositely inclined lateral surfaces disposed on either side of its longitudinal axis, connecting means for supporting articles to be conveyed lying between the lateral surfaces, supporting pulleys arranged in pairs on vertical axes one on either side of the belt and engaging the lateral surfaces to guide and support the belt and additional pulleys also arranged on vertical axes and engaging the belt to maintain it in contact with the supporting pulleys.

6. A belt conveyer for carrying articles by suspension from a belt including in combination an endless belt formed with two pairs of oppositely inclined surfaces each pair being arranged on one side of its longitudinal axis, means for supporting articles to be conveyed disposed in a plane lying between the pairs of inclined surfaces, and guiding and supporting pulleys arranged in pairs one on each side of the belt and each engaging the pair of inclined surfaces on the adjacent side of the belt to support and guide the belt.

7. A belt conveyer for carrying articles by suspension from a belt including in combination an endless belt formed with two pairs of oppositely inclined surfaces each pair being arranged on one side of the longitudinal axis of the belt, means for supporting articles to be conveyed disposed in a plane lying between the pairs of inclined surfaces and guiding and supporting pulleys arranged in pairs on vertical axes one on each side of the belt, each pulley having at its periphery a pair of oppositely inclined surfaces which engage the adjacent pair of oppositely inclined surfaces on the belt to support and guide the belt.

8. A belt conveyer for carrying articles by suspension from a belt including in combination an endless belt formed with two pairs of oppositely inclined surfaces each pair being arranged on one side of the longitudinal axis of the belt, means for supporting articles to be conveyed disposed in a plane lying between the pairs of inclined surfaces and guiding and supporting pulleys arranged in pairs on vertical axes one on each side of the belt, each pulley being provided with a V-groove in its periphery the sides of which engage the adjacent pair of oppositely inclined surfaces on the belt to support and guide the belt.

9. A belt conveyer for carrying articles by suspension from a belt including in combination an endless belt having lateral surfaces and connecting means for supporting articles to be conveyed lying between such lateral surfaces and pulleys arranged in pairs one on either side of the belt and engaging the lateral surfaces to support and guide the belt, the belt comprising a flexible but inextensible metallic core and a covering of flexible covering material of a relatively deformable nature completely enclosing the core, this covering comprising at least two layers extending throughout the length of the belt and connected together throughout their lengths.

10. A belt conveyer for carrying articles by suspension from a belt including in combination an endless belt having lateral surfaces and connecting means for supporting articles to be conveyed lying between such lateral surfaces and pulleys arranged in pairs one on either side of the belt and engaging the lateral surfaces to support and guide the belt, the belt comprising a flexible but inextensible metallic core and a covering of flexible covering material of a relatively deformable nature completely enclosing the core, this covering comprising four layers two of which, constituting outer layers, extend along two diametrically opposite sides of the core and are each of the full width of the belt while the other two, constituting intermediate layers, lie one on each of the other two opposite sides of the core between the edge portions of the first two layers, adjacent layers being connected together throughout their lengths.

11. A belt conveyer for carrying articles by suspension from a belt including in combination an endless belt having lateral surfaces and connecting means for supporting articles to be conveyed lying between such lateral surfaces and pulleys arranged in pairs one on either side of the belt and engaging the lateral surfaces to support and guide the belt, the belt comprising a flexible but inextensible metallic core and a covering of flexible covering material of a relatively deformable nature completely enclosing the core, this covering comprising four layers arranged in parallel planes two on each side of the core, the two layers between which the core lies being longitudinally grooved to accommodate the core and adjacent layers being connected together throughout their lengths.

12. A belt conveyer for carrying articles by suspension from a belt including in combination an endless belt formed with two pairs of oppositely inclined surfaces each pair being arranged on one side of the longitudinal axis of the belt, means for supporting articles to be conveyed disposed in a plane lying between the pairs of inclined surfaces and guiding and supporting pulleys arranged in pairs on vertical axes one on each side of the belt, each pulley being provided with a V-groove in its periphery the sides of which engage the adjacent pair of oppositely inclined surfaces on the belt to support and guide the belt, the belt comprising a substantially inextensible core of stranded wire and a covering of covering material of a flexible relatively deformable nature such as leather, woven fabric, balata or rubber, which completely encloses the core and comprises four layers two of which, constituting outer layers, ertend along two diametrically opposite sides of the core and are each of the full width of the belt while the other two, constituting intermediate layers, lie one on each of the other two opposite sides of the core between the edge portions of the first two layers, the layers being cemented together throughout their length.

13. A belt conveyer for carrying articles by suspension from a belt including in combination an endless belt formed with two pairs of oppositely inclined surfaces each pair being arranged on one side of the longitudinal axis of the belt, means for supporting articles to be conveyed disposed in a plane lying between the pairs of inclined surfaces and guiding and supporting pulleys arranged in pairs on vertical axes one on each side of the belt, each pulley being provided with a V-groove in its periphery the sides of which engage the adjacent pair of oppositely inclined surfaces on the belt to support and guide the belt, the belt comprising a substantially inextensible core of stranded wire and a covering of covering material of a flexible and relatively deformable nature such as leather, woven fabric, balata or rubber, which completely encloses the core and comprises four layers arranged in parallel planes with the two intermediate layers grooved to receive the core, adjacent layers being cemented together throughout their lengths.

ABRAM SIMON.